United States Patent [19]

Shaffer

[11] Patent Number: 4,761,713

[45] Date of Patent: Aug. 2, 1988

[54] GLYCOL BASED MID-VOLT CAPACITOR

[75] Inventor: Jesse S. Shaffer, Veldhoven, Netherlands

[73] Assignee: North American Philips Corp., New York, N.Y.

[21] Appl. No.: 118,483

[22] Filed: Nov. 6, 1987

[51] Int. Cl.$^4$ .............................................. H01G 9/02
[52] U.S. Cl. .................................... 361/433; 252/62.2
[58] Field of Search ................ 361/433; 252/62.2, 567

[56] References Cited

U.S. PATENT DOCUMENTS

| | | | |
|---|---|---|---|
| 4,024,442 | 5/1977 | Anderson | 361/433 |
| 4,447,346 | 5/1984 | MacNamee et al. | 361/433 X |
| 4,509,094 | 4/1985 | Finkelstein et al. | 252/62.2 X |

Primary Examiner—Donald A. Griffin
Attorney, Agent, or Firm—Norman N. Spain

[57] ABSTRACT

An electrolytic capacitor having an electrolyte consisting essentially of a solution in ethylene glycol of 8–12% by weight of ammonium benzoate, 2.5–4% by weight of ammonium azelate, 1.5–3% by weight of ammonium sebaccic, and 2–3% by weight of water.

6 Claims, No Drawings

GLYCOL BASED MID-VOLT CAPACITOR

BACKGROUND OF THE INVENTION

This invention relates to a new and novel electrolytic capacitor particularly useful for mid-volt applications. The term "mid-volt" being defined for the purposes of the instant invention as the 100–325 volt range.

Electrolytic capacitors that are frequently employed for use in mid-volt applications present the problems of employing as electrolytes materials that are environmentally undesirable. Such materials include dimethylforamide, dimethylacetamide, boric acid and other environmentally undesirable materials.

Also many electrolytic capacitors that are used in the mid-volt range suffer from the deficiency of having relatively poor properties when employed at elevated temperatures, for example, at temperatures of from 90° C. to 120° C. Additionally, some of these known capacitors have undesirably short life usefulness. Japanese Kokai No. 56-51821 shows a low resistivity electrolyte for use in capacitors having a good chemical stability. However, the electrolytes shown include as an essential ingredient a boric acid or a salt of boric acid which are considered to be environmentally undesirable materials.

BRIEF SUMMARY OF THE INVENTION

A principal object of this invention is to provide an electrolytic capacitor free of environmentally undesirable ingredients which is particularly useful for the mid-volt range.

These and other objects of the invention will be apparent from the description that follows.

According to the invention, the applicant has developed a new and novel electrolytic capacitor comprising an anode provided with a dielectric insulated layer, a cathode and an electrolyte, the electrolyte consisting essentially of a solution in ethylene glycol of the ammonium salts of sebaccic, azelaic and benzoic acids and a minor amount of water.

The capacitors of the invention have the advantage of being free of environmentally undesirable ingredients. Additionally these capacitors have low internal resistances and demonstrate a high capacitance and a high degree of capacitive retention even when operating at a high operating temperature for an extended period of time.

DETAILED DESCRIPTION OF THE INVENTION

The invention will now be described in greater detail with reference to the following examples and tables.

In the novel capacitors of the invention, the anode and cathode may be formed of such known valve metals as aluminum, titanium, niobium, and tantalum.

Preferably the capacitors of the invention are aluminum impregnated cartridge type capacitors of conventional design. In such a capacitor an aluminum foil anode and an aluminum foil cathode, at least one of which has an oxide film thereupon is separated by a paper spacer impregnated with the electrolyte and wound into a cylindrical shape and sealed in a container of aluminum.

It is found that in general the most improved results are produced with an electrolyte of the invention containing 8–12% by weight of ammonium benzoate, 0.5–4.5% by weight of ammonium azelate, 1.5–3.5% of ammonium sebacate and 2–3% of water dissolved in ethylene glycol. In a particularly useful embodiment the electrolyte of the invention contains about 2% by weight of ammonium zebacate, 2.5% of ammonium azelate, 5% of ammonium benzoate and 2% by weight of water.

EXAMPLE

An electrolyte was prepared by dissolving 2% by weight of ammonium sebacate, 2.5% by weight of ammonium azelate, 5% by weight of ammonium benzoate and 2% by weight of dionized water, 89.5% by weight of ethylene glycol at 85° C.

The resultant electrolyte exhibited the following properties, resistivity at 25° C.=396 ohms-cm, pH at 100% concentration=6.52, pH at 10% concentration=5.47, K.F. % $H_2O$=3.0% scintillation voltage at 85° C.=340 volts.

A number of capacitors were prepared and subjected to life tests. Each capacitor consisted of an anode foil of aluminum provided with a dielectric oxide layer, in a cathode aluminum foil. The anode foil was etched and formed at 325 volts and the cathode foil was etched and formed at 9 volts. Both the anode foil and the cathode foil were provided with a contact lug and together were formed into a roll and separated from each other by a separator of porous paper impregnated with the electrolyte of the example and sealed in an aluminum container. The resultant capacitors had a diameter of 1.375 and a length of 3.125. They were all aged at 260 V at 85° C.

The following tables show the results of life tests carried out at 105° C. and 200 volts DC on a number of properties of these capacitors.

TABLE 1

| Unit | IL 5 | CAP(UF) | % D | ESR | (0 Hours) % CAP RT | REF ESR | WEIGHT | % REF WT. |
|---|---|---|---|---|---|---|---|---|
| 1 | 0.045 | 432 | 2.46 | 75.60 | 100.000 | 100.000 | 96.49 | 100.00 |
| 2 | 0.016 | 433 | 2.62 | 80.10 | 100.000 | 100.000 | 91.35 | 100.00 |
| 3 | 0.019 | 429 | 2.31 | 71.50 | 100.000 | 100.000 | 90.00 | 100.00 |
| 4 | 0.018 | 427 | 2.42 | 75.10 | 100.000 | 100.000 | 96.37 | 100.00 |
| 5 | 0.028 | 424 | 2.66 | 83.20 | 100.000 | 100.000 | 91.40 | 100.00 |
| 6 | 0.048 | 442 | 2.39 | 71.70 | 100.000 | 100.000 | 98.54 | 100.00 |
| 7 | 0.017 | 455 | 2.49 | 72.60 | 100.000 | 100.000 | 97.67 | 100.00 |
| 8 | 0.012 | 424 | 3.15 | 98.40 | 100.000 | 100.000 | 93.27 | 100.00 |
| 9 | 0.017 | 437 | 2.47 | 75.00 | 100.000 | 100.000 | 90.70 | 100.00 |
| 10 | 0.019 | 447 | 2.37 | 70.30 | 100.000 | 100.000 | 99.72 | 100.00 |
| 11 | 0.015 | 436 | 2.39 | 72.60 | 100.000 | 100.000 | 93.85 | 100.00 |
| AVG | 0.023 | 435 | 2.54 | 77.54 | 100.000 | 100.000 | 94.57 | 100.00 |

TABLE 2

| | | | 1500 TEST HOURS COMPLETED | | | | | |
|---|---|---|---|---|---|---|---|---|
| Unit | IL 5 | CAP(UF) | % D | ESR | % CAP RT | % REF ESR | WEIGHT | % REF WT. |
| 1 | 0.006 | 432 | 2.47 | 75.80 | 99.845 | 100.265 | 96.19 | 99.68 |
| 2 | 0.006 | 432 | 2.68 | 82.20 | 99.808 | 102.622 | 91.05 | 99.67 |
| 3 | 0.006 | 428 | 2.40 | 74.50 | 99.851 | 104.196 | 89.68 | 99.65 |
| 4 | 0.006 | 426 | 2.50 | 77.70 | 99.801 | 103.462 | 96.08 | 99.69 |
| 5 | 0.006 | 424 | 2.64 | 82.60 | 99.995 | 99.279 | 91.12 | 99.70 |
| 6 | 0.006 | 441 | 2.47 | 74.40 | 99.824 | 103.766 | 98.28 | 99.73 |
| 7 | 0.005 | 455 | 2.60 | 75.70 | 99.917 | 104.270 | 97.36 | 99.69 |
| 8 | 0.005 | 421 | 2.42 | 76.30 | 99.340 | 77.541 | 93.03 | 99.74 |
| 9 | 0.005 | 437 | 2.60 | 79.10 | 99.911 | 105.467 | 90.41 | 99.67 |
| 10 | 0.006 | 447 | 2.51 | 74.60 | 99.920 | 106.117 | 99.44 | 99.71 |
| 11 | 0.005 | 436 | 2.50 | 76.00 | 100.030 | 104.683 | 93.55 | 99.68 |
| AVG | 0.006 | 434 | 2.53 | 77.17 | 99.840 | 101.061 | 94.20 | 99.69 |

TABLE 3

| | | | 4500 TEST HOURS COMPLETED | | | | | |
|---|---|---|---|---|---|---|---|---|
| Unit | IL 5 | CAP(UF) | % D | ESR | % CAP RT | % REF ESR | WEIGHT | % REF WT. |
| 1 | 0.005 | 431 | 2.59 | 79.70 | 99.688 | 105.423 | 95.79 | 99.27 |
| 2 | 0.005 | 432 | 2.79 | 85.70 | 99.628 | 106.991 | 90.66 | 99.25 |
| 3 | 0.005 | 427 | 2.52 | 78.40 | 99.657 | 109.650 | 89.28 | 99.20 |
| 4 | 0.005 | 425 | 2.61 | 81.30 | 99.602 | 108.256 | 95.62 | 99.22 |
| 5 | 0.005 | 423 | 2.94 | 92.30 | 99.769 | 110.938 | 90.70 | 99.24 |
| 6 | 0.005 | 440 | 2.58 | 77.60 | 99.627 | 108.229 | 97.91 | 99.36 |
| 7 | 0.005 | 454 | 2.67 | 78.00 | 99.732 | 107.438 | 96.97 | 99.29 |
| 8 | 0.005 | 421 | 2.52 | 79.40 | 99.208 | 80.691 | 92.68 | 99.37 |
| 9 | 0.005 | 436 | 2.69 | 81.70 | 99.771 | 108.933 | 90.03 | 99.26 |
| 10 | 0.005 | 446 | 2.73 | 81.20 | 99.736 | 115.505 | 99.01 | 99.29 |
| 11 | 0.005 | 435 | 2.64 | 80.30 | 99.851 | 110.606 | 93.11 | 99.21 |
| AVG | 0.005 | 434 | 2.66 | 81.42 | 99.661 | 106.605 | 93.80 | 99.27 |

In these tables, IL 5 is the leakage current in milliamps after 5 minutes; CAP is the capacitance in microfarads; %D is the loss factor; ESR is the equivalent series resistance in ohms; %CAP RT is the percentage of the initial capacitance retained; %REF ESR is the percentage of the initial equivalent series resistance; WEIGHT is the weight of the capacitor in grams and %REF WT. is the percentage of the initial weight of the capacitor.

As these tests show, even after the life tests as long as 4500 hours, the capacitors of the invention exhibited excellent retention capacitance with only very slight increases in equivalence of series resistances together with almost imperceptible increases in the loss tangent.

It will be apparent to those skilled in the art that various modifications of the present invention may be made without departing from its scope as defined by the following claims.

What is claimed is:

1. An electrolytic capacitor comprising an anode provided with a dielectric oxide layer, a cathode and an electrolyte, said electrolyte consisting essentially of a solution in ethylene glycol of the ammonium salts of sebaccic, azelaic and benzoic acids and a minor amount of water.

2. The capacitor of claim 1 wherein the electrolyte is a solution in ethylene glycol of 8-12% by weight of ammonium benzoate, 2.5-4.5% by weight of ammonium azelate, 1.5-3.5% by weight of ammonium sebaccic and 2-3% by weight of water.

3. The capacitor of claim 2 wherein both anode and cathode are formed of aluminum foil.

4. The capacitor of claim 1 wherein the electrolyte consists essentially of a solution in ethylene glycol of about 2% ammonium sebaccic, about 2.5% ammonium azelate, about 5% ammonium benzoate and about 2% water, all by weight.

5. The capacitor of claim 4 wherein both anode and cathode are formed by aluminum foil.

6. An electrolytic capacitor comprising an aluminum foil anode provided with a dielectric oxide layer, an aluminum foil anode and a spacer separating said anode and cathode foils impregnated with an electrolyte consisting essentially of a solution in ethylene glycol of 8-12% by weight of ammonium benzoate, 2.5-4.5% by weight of ammonium azelate, 1.5-3.5% by weight of ammonium sebaccic and 2-3% by weight of water.

* * * * *